United States Patent Office 2,839,584
Patented June 17, 1958

2,839,584
2,6-BIS(3-METHOXY-4-HYDROXYBENZYL) CYCLOHEXANOL

John D. Garber, Cranford, N. J., assignor to Merck & Co., Inc., Rahway, N. J., a corporation of New Jersey No Drawing. Application December 24, 1954
Serial No. 477,599

1 Claim. (Cl. 260—613)

This invention is concerned with 2,6-bis-(3-methoxy-4-hydroxybenzyl) cyclohexanol and processes of preparing the same.

In accordance with the present invention, I have discovered that 2,6-bis-(3-methoxy-4-hydroxybenzyl) cyclohexanol, which can be represented by the structural formula

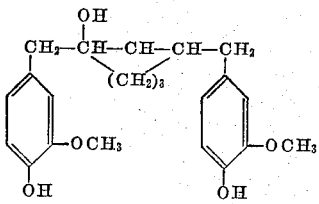

is obtained when 2,6-divanillalcyclohexanone is reacted with hydrogen in the presence of a hydrogenation catalyst. This compound is useful in the field of chemistry. In particular, it is a useful antioxidant which may be utilized in oils, fats, and other materials for the prevention of oxidative deterioration.

I have found that 2,6-bis-(3-methoxy-4-hydroxybenzyl) cyclohexanol is conveniently produced by intimately contacting 2,6-divanillalcyclohexanone with hydrogen in the presence of a noble metal catalyst. Generally, I find it advantageous to carry out this reaction in an inert solvent for the starting material such as dioxane, ethanol, methanol, and the like. The hydrogenation proceeds readily at room temperature and I therefore find it most convenient to carry it out at this temperature, although higher or lower temperatures can also be employed. The reaction can be effected at atmospheric pressure or superatmospheric pressure, but I prefer to use low pressures since this avoids the need to use expensive high-pressure reactors.

After the hydrogenation is complete, the desired product is readily recovered by removing the catalyst and evaporating the resulting solution to dryness. The product so obtained can then be further purified, if desired, by recrystallization from suitable solvents such as aqueous ethanol.

The starting material, 2,6-divanillal cyclohexanone which can be represented by the structural formula

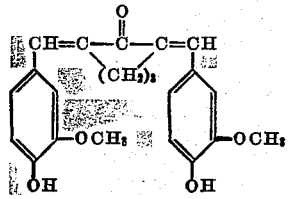

can be readily prepared by the reaction of vanillin with cyclohexanone in the presence of hydrochloric acid in accordance with methods known in the art.

When 2,6-bis-(3-methoxy - 4 - hydroxy-benzyl) cyclohexanol was tested for antioxidant activity by adding 1 mg. of the compound dissolved in about 1 ml. of ethanol to 10 g. of lard, it was found to significantly retard the formation of peroxides. In addition, it was found that wafers prepared from flour and lard to which 2,6-bis-(3-methoxy-4-hydroxybenzyl) cyclohexanol was added at the level of 1 mg. per 10 gms. of lard were protected against olfactometric rancidity considerably longer than wafers prepared with pure lard.

The following example illustrates the method of preparing my new compound.

Example

A solution of 7.3 g. (0.02 mole) of 2,6-divanillalcyclohexanone in 125 ml. of dioxane was hydrogenated at about 43 p. s. i. g. in the presence of 0.2 g. of platinum oxide at room temperature. About three moles of hydrogen were absorbed per mole of starting compound. The catalyst was removed by filtration, washed with dioxane and the filtrate concentrated by distillation under reduced pressure and evaporated to dryness on the steam bath to yield about 8.8 g. of golden-brown tacky solid. After several recrystallizations from aqueous ethanol solution, the 2,6-bis-(3-methoxy - 4 - hydroxybenzyl) cyclohexanol was obtained in the form of a white crystalline solid melting at 162.8–163.5° C.

*Analysis.*—Calculated for the alcohol $C_{22}H_{28}O_5$: C, 70.94%; H, 7.58%. Found C, 71.47; H, 8.23.

The product did not give a positive reaction when tested with 2,4-dinitrophenylhydrazine.

The 2,6-divanillalcyclohexanone employed as the starting material in the foregoing example may be prepared in accordance with the procedures described by Samdahl and Samdahl and Hanson (Chemical Abstracts 22, 3145, and 28, 5424, respectively). In accordance with the described procedures, vanillin was fused by heating on a steam bath and mixed with cyclohexanone. After adding a small quantity of concentrated hydrochloric acid the reaction mixture was allowed to stand overnight at room temperature. It was then washed with water, and the resulting product recrystallized from benzene. The 2,6-divanillalcyclohexanone was obtained in the form of brown-yellow crystals melting at 178–180° C.

Various changes and modifications in the procedures herein disclosed will occur to those skilled in the art, and to the extent that such changes and modifications are embraced by the appended claim, it is to be understood that they constitute part of my invention.

I claim:

2,6-bis(3-methoxy-4-hydroxybenzyl) cyclohexanol.

References Cited in the file of this patent

UNITED STATES PATENTS

| | | |
|---|---|---|
| 2,021,567 | Muckenfuss | Nov. 19, 1935 |
| 2,622,111 | Haensel | Dec. 16, 1952 |
| 2,644,822 | Pearl | July 7, 1953 |

OTHER REFERENCES

Vorlander: Chemical Abstracts, vol. 19, 1925, p. 1415.
Samdahl et al.: Chem. Abs., vol. 22 (1928), p. 3145.
Samdahl et al.: Chem. Abstracts, vol. 28, 1934, p. 5424.
Groggins: Unit Processes in Organic Synthesis (1952), pp. 488, 498.